(12) United States Patent
Creamer et al.

(10) Patent No.: US 7,215,743 B2
(45) Date of Patent: May 8, 2007

(54) TELEPHONY SIGNALS CONTAINING AN IVR DECISION TREE

(75) Inventors: Thomas E. Creamer, Boca Raton, FL (US); Peeyush Jaiswal, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 10/324,917

(22) Filed: Dec. 20, 2002

(65) Prior Publication Data

US 2004/0120479 A1    Jun. 24, 2004

(51) Int. Cl.
*H04M 1/64* (2006.01)
(52) U.S. Cl. .............................. 379/88.18; 379/88.23; 705/26; 370/352
(58) Field of Classification Search ............. 379/88.18, 379/202, 257, 374, 67.1, 88.23; 370/352, 370/401, 338; 705/6, 26, 43
See application file for complete search history.

(56) References Cited

U.S. PATENT DOCUMENTS

| | | | |
|---|---|---|---|
| 4,811,382 A * | 3/1989 | Sleevi .................... 379/67.1 |
| 5,850,429 A | 12/1998 | Joyce et al. ................. 379/88 |
| 5,884,032 A | 3/1999 | Bateman et al. ....... 395/200.34 |
| 5,946,377 A | 8/1999 | Wolf ....................... 379/88.22 |
| 6,052,367 A | 4/2000 | Bowater et al. ............ 370/352 |
| 6,091,805 A | 7/2000 | Watson .................... 379/93.17 |
| 6,321,198 B1 | 11/2001 | Hank et al. ................. 704/270 |
| 6,332,154 B2 | 12/2001 | Beck et al. ................. 709/204 |
| 6,542,497 B1 * | 4/2003 | Curry et al. ................ 370/352 |
| 6,842,737 B1 * | 1/2005 | Stiles et al. .................... 705/6 |
| 6,920,431 B2 * | 7/2005 | Showghi et al. ............. 705/26 |
| 7,065,188 B1 * | 6/2006 | Mei et al. ................ 379/88.23 |
| 2002/0069170 A1 * | 6/2002 | Rizzo et al. .................. 705/43 |

FOREIGN PATENT DOCUMENTS

TW        474090 B      1/2002

* cited by examiner

*Primary Examiner*—Gerald Gauthier
(74) *Attorney, Agent, or Firm*—Akerman Senterfitt

(57) ABSTRACT

A method for receiving and presenting interactive voice response data can include sending a telephony connectivity request for establishing a voice channel connection between an originating device and a interactive voice response system. Prior to establishing the voice channel connection, an interactive voice response menu associated with said interactive voice response system can be received via a ringback channel. At least a portion the interactive voice response menu can be presented to a user of the originating device.

32 Claims, 6 Drawing Sheets

TELEPHONY SIGNALS CONTAINING AN IVR DECISION TREE

BACKGROUND OF THE INVENTION

1. Technical Field

The present invention relates to the field of telecommunications and, more particularly, to interactive voice response applications and pre-connection telephony signals.

2. Description of the Related Art

The advent of interactive voice response (IVR) applications for use in telephone systems has reduced operating costs for many types of businesses by reducing telephone related staffing requirements. Such IVR applications typically answer incoming telephone calls and present to callers audible menus of selectable options. The callers usually make menu selections in one of two ways: depressing a key or sequence of keys on a touch tone keypad; or issuing a spoken utterance.

Oftentimes a plurality of hierarchically related menus are presented which a caller must navigate to find the option that the caller wishes to select. Navigating through such menus can be time consuming and frustrating, especially if the caller makes an incorrect selection during the navigation process. Consequently, callers often hang up prior to successfully navigating the menus or opt out of the menu system in an attempt to speak with an operator. Particularly concerning are the cases in which callers that hang up in frustration are potential customers or clients. Although such frustrations could be minimized by allowing callers a simplified navigational method for contacting a desirable node within an IVR menu, conventional systems offer callers no such alternative means to navigate an IVR menu.

SUMMARY OF THE INVENTION

The invention disclosed herein provides a method and a system for conveying an interactive voice response (IVR) menu to a call originating device using a pre-connection telephony channel. In particular, an IVR system can generate an IVR menu that specifies at least a portion of an IVR decision tree utilized by the IVR system. This IVR menu can be transported from the IVR system to the originating device before a voice channel connection is established between the originating device and the IVR system. The originating device can display the IVR menu. Additionally, the originating device can transport a user-selected node of the IVR menu to the IVR system. Thereafter, the IVR system can establish a voice channel connection with the originating device and navigate to a location within the IVR system specified by the user-selected node.

Notably, examining an IVR menu presented on a display can reduce call duration and can be much more efficient than an audibly presented menu. Rather than audibly listening to each menu option presented, a user of the present invention can, in particular embodiments, visually identify and select relevant menu options. Unlike conventional IVR systems which can require a user to memorize numbers correlating to menu options, the present invention can enable a user to view menu option descriptions while making the menu selections. Accordingly, the risk of a user forgetting a number associated with a particular menu option can be reduced, thereby saving the customer time and frustration as well as reducing system resource usage. The present invention also enables a user to download an IVR menu and view the IVR menu after terminating the communications link with the IVR system.

One aspect of the present invention can include a method for receiving and presenting IVR data. According to the method, an originating device can send a telephony connectivity request for establishing a voice channel connection between the originating device and an IVR system. The IVR menu can be associated with the IVR system. Prior to the establishment of the voice channel connection, the originating device can receive the IVR menu from the IVR system via a ringback channel. At least a portion the IVR menu can be presented to a user of the originating device. In one embodiment, prior to establishing the voice channel connection, the originating device can convey an IVR option via a CNG channel to the IVR system. In another embodiment, a means for interactively navigating the IVR menu can be provided.

In a particular embodiment, the originating device can be disconnected before the voice channel connection is established. In that case, the originating device can store the IVR menu. The presenting of the IVR menu to the user can occur after the originating device is disconnected. In one embodiment, a presentation device that is communicatively linked to the originating device can present and navigate the IVR menu.

In another embodiment, the originating device can identify a user-selected node of the IVR menu. The user-selected node can then be transmitted to the IVR system. Additionally, a voice channel connection can be established between the IVR system and the originating device. The IVR system can navigate to a location specified by the user-selected node. In one embodiment, the user-selected node can be transmitted to the IVR system via a CNG channel before the establishment of the voice channel connection. In another embodiment, the node signal can be transmitted after the establishment of the voice channel connection.

Another aspect of the present invention can include a method for providing IVR data to a telephony device. An IVR system can receive a telephony connectivity request for establishing a voice channel connection between an originating device and the IVR system. The IVR system can contain an internal IVR decision tree. Prior to establishing the voice channel connection, the IVR system can transmit an IVR menu specifying at least a portion of the IVR decision tree to the originating device via a ringback channel. In one embodiment, at least a portion of the IVR menu can be dynamically generated.

In a particular embodiment, prior to establishing the voice channel connection, the IVR system can receive an IVR option from the originating device sent via a CNG channel. The IVR system can generate an option response based upon the received IVR option. The option response can be transmitted to the originating device via a ringback channel prior to the establishment of the voice channel connection.

In another embodiment, the IVR system can access specific information based upon the identity of the originating device. At least a portion of the IVR menu can be modified based upon this specific information. In one particular embodiment, the IVR system can terminate a connection with the originating device prior to the establishment of the voice channel connection. Embodiments exist where the IVR system can receive a user-specified node. The IVR system can responsively navigate to a location within the IVR system specified by the user-selected node. Additionally, the IVR system can establish the voice channel connection. In one embodiment, the user-selected node can be received via a CNG channel before the voice channel connection is established. In another embodiment, the user-selected node can be received after the voice channel connection is established.

Another aspect of the present invention can include a system for providing telephony IVR functions including an IVR system communicatively linked to a telephony network. The IVR system can be configured to send and receive digitally encoded pre-connection telephony signals specifying IVR data. In one embodiment, the IVR system can be a network element within the telephony network. In another embodiment, the IVR system can be switch independent application.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for conveying interactive voice response (IVR) data to a call originating device using pre-connection telephony communication channels. The call originating device can receive and display an IVR menu. Additionally, the invention can provide a means to navigate the IVR menu. It should be noted that the displaying and the navigation of the IVR menu can occur off-line. The originating device can allow a user to select a node from within the presented IVR menu. The user-selected node can then be conveyed to the IVR system. A telephony voice channel connection can be established between the IVR system and the originating device and the IVR system can navigate to a location specified by the user-selected node.

Figure 1:
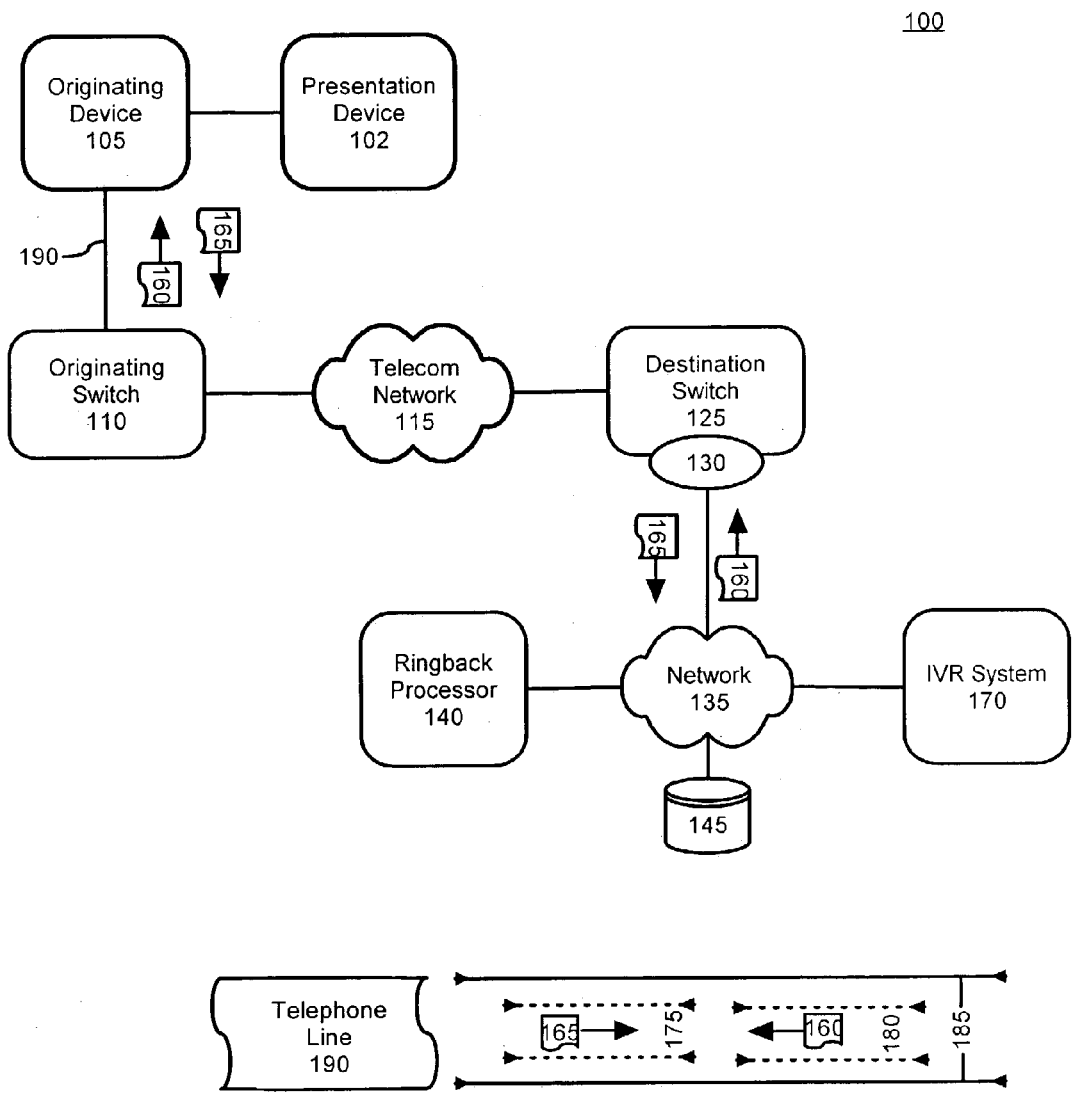
FIG. 1 is a schematic diagram illustrating an exemplary telephony system including an interactive voice response (IVR) system in accordance with the inventive arrangements disclosed herein.

FIG. 1 is a schematic diagram illustrating a telephony system 100 which can include an IVR system in accordance with the inventive arrangements disclosed herein. As shown in FIG. 1, the system 100 can include an originating switch 110, a telecom network 115, a destination switch 125, an IVR system 170, an originating device 105, a presentation device 102, as well as a telephone line 190 showing a ringback channel 180 and a CNG channel 175. The originating device 105 can be communicatively linked to a telecom network 115 and can originate a telephony voice channel connection with a receiving device 120. Originating devices 105 can include, but are not limited to, telephones, cellular phones, fax machines, and computer devices equipped with modems.

The presenting device 102 can be a device capable of presenting at least a portion of an IVR menu 160. Additionally, in one embodiment, the presenting device 102 can provide a means for interactively navigating the IVR menu. The presentation device 102 can be a standalone device or can be integrated with the originating device 105. When the presentation device 102 is physically distinct from the originating device 105, a communication link can be established between the two devices. In such a case, a signal specifying an IVR menu 160 can be conveyed from the originating device 105 to the presenting device 102 across this communication link.

In one embodiment, the presentation device 102 can be a personal computer configured to display and navigate an IVR menu. In another embodiment, the presentation device 102 can be an output device, such as a printer or facsimile machine, configured to produce a printed representation of an IVR menu. In yet another embodiment, the presentation device 102 can be a personal data assistant (PDA) that can display and navigate an IVR menu via a touch-screen.

While in many embodiments the IVR menu can be visually displayed, other embodiments can exist. For example, in one embodiment, the presentation device 102 can be a dictation machine capable of audibly storing and presenting an IVR menu. In another embodiment, the presentation device 102 can be a Braille pad, configured to allow sightless users to receive and navigate an IVR menu. The presentation device 102 should not be limited to the particular examples given, but can be any device capable of presenting an IVR menu to a user.

The originating switch 110 can be a node within a telephony network that can facilitate the connection between telephony devices, such as telephones and other customer premise equipment. Notably, switches, such as the originating switch 110 and the destination switch 125, can connect customer premise equipment to the telecom network 115. Hence, the originating switch 110 can connect an originating device 105 to the telecom network 115. Similarly, the destination switch 125 can be a node within the telecom network 115 communicatively linking a receiving device 120 to the telecom network 115. Since one switch can connect many telephony devices to a given network, both the originating device 105 and the IVR system 170 can be connected to the same switch. Accordingly, embodiments can exist where the originating switch 110 and the destination switch 125 are the same switch.

The telecom network 115 can be any series of points or nodes connected by a series of interconnection paths capable of connecting the originating switch 110 to the destination switch 125. For example, the telecom network 115 can be a circuit-switched network included within the public switched telephone network (PSTN). In another embodiment, portions of the telecom network 115 can be a commercially owned proprietary packet-switched network with Voice over Internet Protocol (VoIP) capabilities.

The telephone line 190 can be a line that connects a telephony device (customer premise equipment) to the telecom network 115. Physically, the telephone line 190 can include, but is not limited to, such a medium as a twisted pair, a coaxial cable, a fiber optic cable, as well as a wireless connectivity pathway. Signals can be conveyed through a voice channel 185 within the telephone line 190. This voice channel 185 can be a bandwidth segment, typically 64 kbps, utilized by a telephony network for a single voice connection. The voice channel 185 can operate within the voice band, wherein the voice band can include the frequency range of approximately 0 to 3,400 Hz, which is sufficient bandwidth to convey intelligible human speech. Ordinary telephone service is often restricted to the voice channel 185, while other services, such as a digital subscriber line (DSL) service, can utilize a broader frequency range.

A CNG channel 175 can include a frequency range within the voice band through which an IVR data signal 165 can be transmitted from the originating device 105 to an IVR system 170 before the establishment of a telephony voice channel connection. While the CNG channel 175 is always capable of transporting a pre-connection FAX CNG signal, the exact frequency range available within the CNG channel 175 can vary according to filters in the telecom network 125 which typically have a passband at or around 1,100 Hz. For example, in one embodiment, frequencies below approximately 300 Hz and above approximately 2,400 Hz can be filtered. The resulting CNG channel 175 can include the frequency range from approximately 300 Hz to 2,400 Hz. In another embodiment, all frequencies that deviate from the 1,100 Hz frequency (used by the FAX CNG signal according to T 0.30 protocol) by more than 200 Hz can be filtered. Accordingly, the CNG channel 175 can include the frequency range from approximately 900 Hz to 1,300 Hz.

In one embodiment, signals within the CNG channel 175 can be digitally encoded by intermittently turning on and off a frequency of about 1,100 Hz, where an "on state" can represent a digital one, and an "off state" can represent a digital zero, or vice versa. In an alternate embodiment, signals within the CNG channel 175 can utilize a modulation technique with a base or carrier frequency of about 1,100 Hz. Furthermore, specific modulation techniques, such as phase key shifting (PKS) and frequency key shifting (FKS), can be used in particular embodiments of the invention. Still, digitally encoded signals can be generated using any of a variety of modulation schemes including, but not limited to, time division multiplexing, frequency modulation, phase modulation, amplitude modulation, and pulse code modulation. Accordingly, the present invention is not limited by the particular data encoding or modulation type. Rather, any suitable data encoding and/or modulation scheme can be used to carry information over the defined telephony channels.

The ringback channel 180 can include a frequency range within the voice channel 185 wherein signals can be conveyed to the originating device 105 from the IVR system 170. The ringback channel 180 can be a back channel through which a ringback signal is ordinarily sent from a telephony switch to an originating device 105. The ringback signal is an intermittent audio tone that the originating device 105 receives after dialing a number, when the distant end of the circuit or the IVR system 170 is receiving a ringing signal. While the ringback signal is typically an analog signal both digital and analog signals can be conveyed through the ringback channel 180.

The IVR system 170 can include an internal decision tree which contains a plurality of menus. A user of the originating device 105 can access selective ones of these menus upon placing a telephone call to a phone number associated with the IVR system 170. Additionally, the IVR system 170 can be capable of generating and transmitting signals containing the IVR menu 160 to the originating device 105. The IVR menu 160 can specify at least a portion of the internal decision tree contained within the IVR system 170.

In one embodiment, the IVR system 170 can include a provisioning interface to enable menu construction and entry of IVR menus into the IVR system 170. For instance, a menu construction module and a GUI can be provided within the IVR system 170. Menu construction tools can be provided within the menu construction module to facilitate menu construction, as is known to those skilled in the art of programming software applications. The provisioning interface can further include a programming language interface and/or macro tools which enable functions to be associated with IVR menus and IVR menu options. Notably, the functions can include commands, logical operators, conditional statements, and any other code used in computer programming.

In the course of performing IVR operations, the IVR system 170 can access an IVR repository 145. The IVR repository 145 can contain specific information about a particular IVR menu. The IVR repository 145 can be a data store internal or external to the IVR system 170. Additionally, the IVR repository 145 can contain data specifying different access levels for different originating devices. For instance, in one embodiment, the IVR system 170 can allow some originating devices to access IVR decision tree nodes not available to other originating devices. Such originating device 105 specific information can be stored within the IVR repository 145.

The IVR system 170 can include one or more IVR servers containing one or more IVR applications. In one embodiment, the IVR system 170 can include a network element that interfaces with the destination switch 125 through a gateway 130. In another embodiment, the IVR system 170 can include a standalone solution interfacing directly with the destination switch 125 without utilizing gateway 130 as an intermediary. For example, an IVR application within the IVR system 170 can be disposed within an electronic private automatic branch exchange system (EPABX) owned and maintained by a particular business. The EPABX can be directly linked to a telephony switch owned by a telephony carrier and linked to the telecom network 115. In yet another embodiment, IVR system 170 can include a program disposed within the destination switch 125.

The network 135 can be any series of points or nodes connected by a series of interconnection paths capable of connecting destination switch 125 to the IVR system 170 and transporting packet-switched messages between connected nodes. For example, the network 135 can be the Internet. Alternately, the network 135 can be an intranet utilized by a telecom carrier that owns the destination switch 125. Additionally, a gateway 130 can be used to interface between the IVR system 170 and the destination switch 125. In one embodiment, the gateway 130 can facilitate switch independent application programming by providing a set of open network application programming interfaces (APIs). These interfaces can translate standardized telephony commands to switch specific ones. Additionally, the gateway 130 can function as a layer of abstraction between a telephony network and an application, providing standardized routines to ease many programming tasks.

For example, in one embodiment, the gateway 130 can be a Parlay gateway capable of interfacing any Parlay compliant application to a Parlay compliant telecom network 115. In another embodiment, the gateway 130 can be a software platform, such as the International Business Machines (IBM) Resource Manager, which is commercially available from IBM Corporation of Armonk, N.Y., that can provide the IVR system 170 value-added telephony applications and services. In yet another embodiment, the gateway 130 can include JAVA APIs for Integrated Networks (JAIN) allowing the IVR system 170 to be implemented as a switch independent JAIN compliant application.

In operation, the originating device 105 can place a call to the IVR system 170 through the telecom network 115. The originating device 105 can send a connectivity request through the originating switch 110 across the telecom network 115 to the destination switch 125. Notably, when both the originating device 105 and the IVR system 170 are connected to the same switch, the connectivity request can be handled directly by that switch, which can function as both the originating switch 110 and the destination switch 125. The destination switch 125 can then send an IVR inquiry to the IVR system 170. The IVR system 170 can access the IVR repository 145 and generate an IVR menu 160 specifying at least a portion of the internal decision tree used by the IVR system.

Thereafter, the IVR menu 160 can be conveyed to the originating device 105 via the ringback channel 180. Notably, the ringback processor 140 can be utilized to facilitate the transmission of the IVR menu 160. At this point, the connection between the originating device 105 and the IVR system 170 can be disconnected. The IVR menu 160 can be conveyed from the originating device 105 to the presenting device 102. The presentation device 102 can display the IVR menu within a graphical user interface (GUI). A user can navigate the IVR menu within this GUI and select a particular node within the IVR menu.

The user-selected node 165 can be conveyed to the IVR system 170. In one embodiment, the user-selected node 165 can be conveyed to the IVR system 170 through the CNG channel 175 before a voice channel connection is established with the IVR system 170. In another embodiment, a voice channel connection is first established with the IVR system 170. The user-selected node 165 is thereafter transmitted. Regardless of when the user-selected node 165 is conveyed, the IVR system 170 can responsively navigate to a location specified by the user-selected node 165. Consequently, the IVR system can establish a voice channel connection with the user of the originating device 105 and navigate to a user-selected location.

It should be noted that functions attributed to the presentation device 102 in FIG. 1 can be performed by the originating device 105. Indeed, in many embodiments, a physically separate presentation device need not be utilized or incorporated.

While in one embodiment the IVR system 170 can be configured to generate a digitally encoded signal specifying the IVR menu without assistance, in another embodiment, a ringback processor 140 can assist in these transmissions. The ringback processor 140 can be an application capable of receiving data and conveying this data as analog and digital signals over the ringback channel 180. The ringback channel 180 can be a segment of telephony bandwidth within the voice frequency range (approximately 0–3,400 Hz) reserved for pre-connection transmissions between a telephony switch and the originating device 105. Typically, an intermittent analog signal representing the ringing of a data source is sent along this ringback channel.

Figure 2:
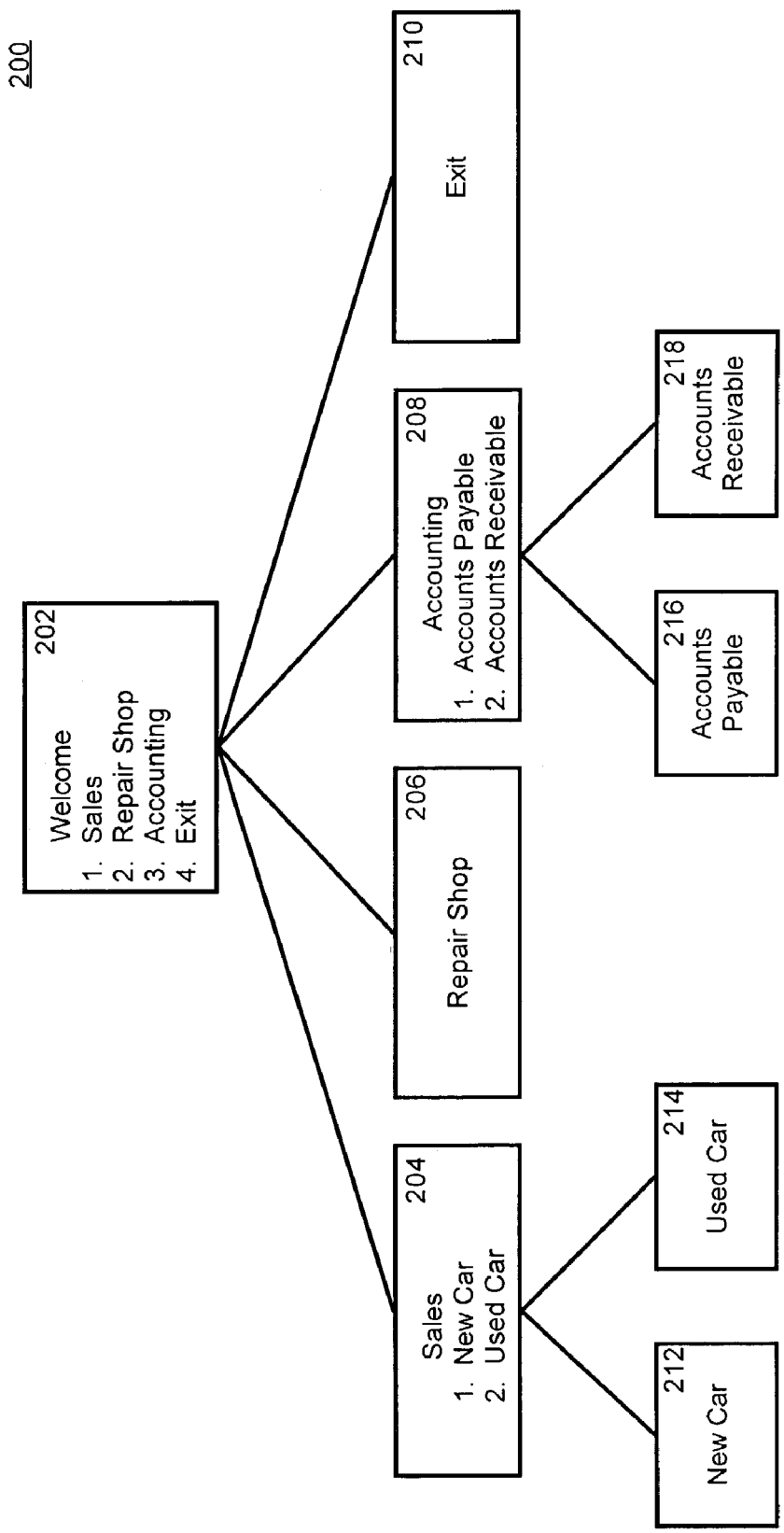
FIG. 2 is a schematic diagram illustrating a view of an IVR menu which can be presented on a presentation device in accordance with the system of FIG. 1.

FIG. 2 is a schematic diagram illustrating a menu 200 in accordance with the system of FIG. 1. Unlike many conventional IVR menu hierarchies that require a user to audibly listen to IVR options while connected to an IVR system via a voice channel connection, a signal specifying menu 200 can be conveyed to the user. Once the user is presented with the menu 200, the user need not maintain a connection with the IVR system. Consequently, the user can incur fewer telephony toll charges. Since the signal containing the menu 200 can be conveyed via a pre-connection ringback channel, the user can, in fact, receive the menu 200 before any changes are incurred. Additionally, since the user need not be actively connected to the IVR system, resources of the IVR system can be made available to other users.

The menu 200 is shown with a hierarchical structure having leaves presented in parent/child relationships. Menu 200 can include a variety of leaves 202, 204, 206, 208, 210, 212, 214, 216, and 218 that can each contain one or more IVR options. IVR options correspond to various termination points, wherein the termination points can be internal to the menu or external. For example, some IVR options that are linked to IVR leaves can be primarily navigational in nature. These navigational IVR leaves can group similar IVR functions together. Other IVR options can redirect a caller to a particular phone extension or to an external telephone number.

For example, leaf 202 can be presented with navigational IVR options that specify child leaves located at a hierarchical level below leaf 202. More particularly, the specified child leaves include a sales leaf 204, a repair shop leaf 206, an accounting leaf 208, and an exit leaf 210. Hence, leaf 202 can be a navigational IVR leaf.

The selection of the sales option designated as the first IVR option can cause the IVR system to branch to the sales leaf 204. Notably, the sales leaf 204 can have two IVR options, each designating a particular child node. The selection of IVR option 2 from within sales leaf 204 can cause the IVR system to branch to the used car leaf 214. When leaf 214 is selected, a voice channel connection can be established between a person accessing menu 200 and an individual within a designated used car department. Hence, leaf 214 can be a leaf associated with a telephony extension.

In one embodiment, the user can select any node within menu 200. For example, a user can select node 216 from menu 200. Such a selection can be made directly without requiring the selection of IVR options from leaves higher in the hierarchical structure, such as the parent leaves 208 or grandparent leaf 202. Accordingly, a user need not spend unnecessary time selecting navigational leaves, but can instead directly access a desired leaf. The user leaf selection can be conveyed to the IVR system within a signal transmitted by the presentation device or originating device.

In one embodiment, a user of menu 200 can select leaf 216. Thereafter, a telephony voice connection can be established with the IVR system. The presentation device can then sequentially present tones representing the hierarchical pathway required to reach leaf 216. For instance, the tones for 3 and 1 (corresponding to IVR option 3 from within leaf 202 and IVR option 1 from leaf 208) can be submitted to the IVR system causing the IVR system to branch to leaf 216. In another embodiment, instead of conveying a sequence of tones, a digital code can be submitted by the presentation device to the IVR system. In such an embodiment, the IVR system can recognize the submitted code as a designation for leaf 216.

In one arrangement, menus, such as menu 200, can be dynamically configured based at least in part upon available user information and system information. For example, a menu can include only IVR options associated with communication extensions which are presently active and that are manned by persons speaking the user's preferred language. For example, if there are eight sales persons in a particular office that speak Spanish, but four of them are out of the office, the menu can be dynamically configured to only show the IVR options correlating the extensions for the Spanish speaking sales persons that are in the office. Alternatively, an indication can be presented to alert the user to which extensions are available, for example using a visual cue. For instance, the appearance of IVR options correlating to the extensions of sales persons who are out of the office can be changed.

Notably, menus can be optimized for specific users, classes of users, user locations, dates, times, or any other circumstance that can affect IVR navigation or communications link routing. For example, the IVR system can include a program module which determines a region from which a user is calling. Regional determinations can be based upon telephone numbers, nodes being used in the communication network linking the user to the IVR system, or any other location identification method. Users from an English speaking country can be presented menus in English, while users from Spanish speaking countries can be presented menus in Spanish. The menu selections also can be optimized for the user. For instance, if a user is from a Spanish speaking country, menu selections representing communications links can be limited to telephone extensions of Spanish speaking persons.

In addition to IVR options for menu navigation and communications links, additional IVR options can be provided. For example, IVR options can be provided for language selection. The additional IVR options can be activated when needed, for instance, by a user selection of a particular check box in the presentation device. This feature can be a beneficial feature for travelers who use wireless communications devices in foreign countries.

It should be noted that the various menus disclosed herein are shown for purposes of illustration only. Accordingly, the present invention is not limited by the particular menus presented herein. Rather, those skilled in the art will recognize that any of a variety of different menus can be used. For example, the menus can be any menu type, can have any menu structure, and can be presented with any number of levels.

Figure 3:
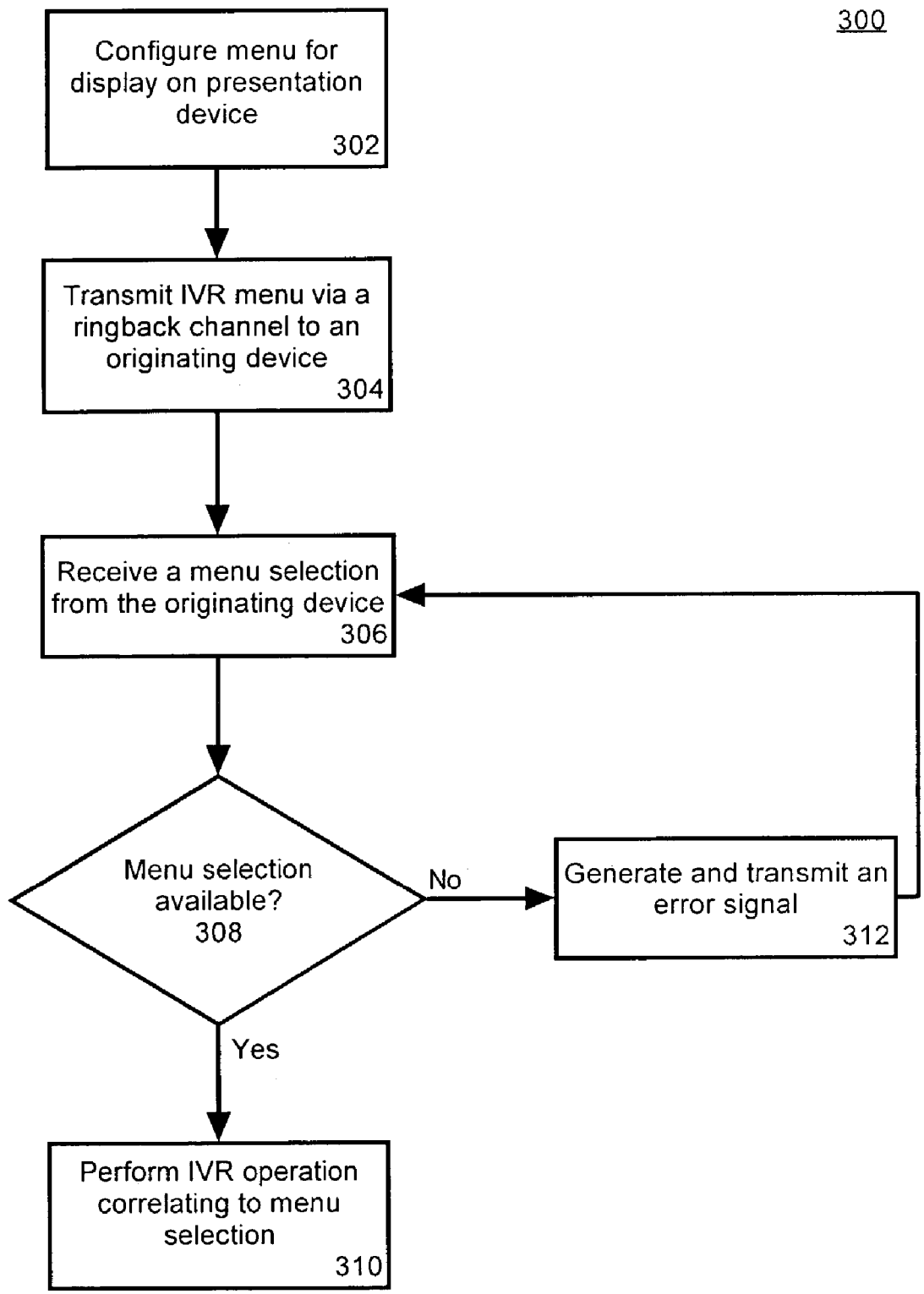
FIG. 3 is a flow chart illustrating a method of providing user navigation within an IVR system using the menu of FIG. 2.

FIG. 3 is a flow chart illustrating a method 300 of providing user navigation within an IVR system using the menu of FIG. 2. The method can begin in a state where an originating device has contacted an IVR system in order to receive an IVR menu. In step 302, an IVR system can generate a menu configured for display on a particular presentation device. This menu can be encoded within a signal for transmission. In step 304, the generated menu can be transmitted to an originating device via a ringback channel. A user receiving the IVR menu can then display the menu within a graphical user interface (GUI). The user can select a menu node and submit this user-selected node to the IVR system.

In step 306, the IVR system can receive a menu selection from the originating device. As noted, a user can directly select menu options at any node of a menu hierarchy, thereby relieving a user from navigating complicated menu structures to make a menu selection. In step 308, the IVR system can determine whether the received menu selection is available. If it is available, the method can proceed to step 310, where the IVR system can perform an operation correlating to the menu selection. If a menu selection has been made that does not correlate to an available option, the method can proceed to step 312, where an error signal can be generated and transmitted to the originating device. Thereafter, the method can proceed to step 306, where the IVR system can wait for a next menu selection.

Figure 4:
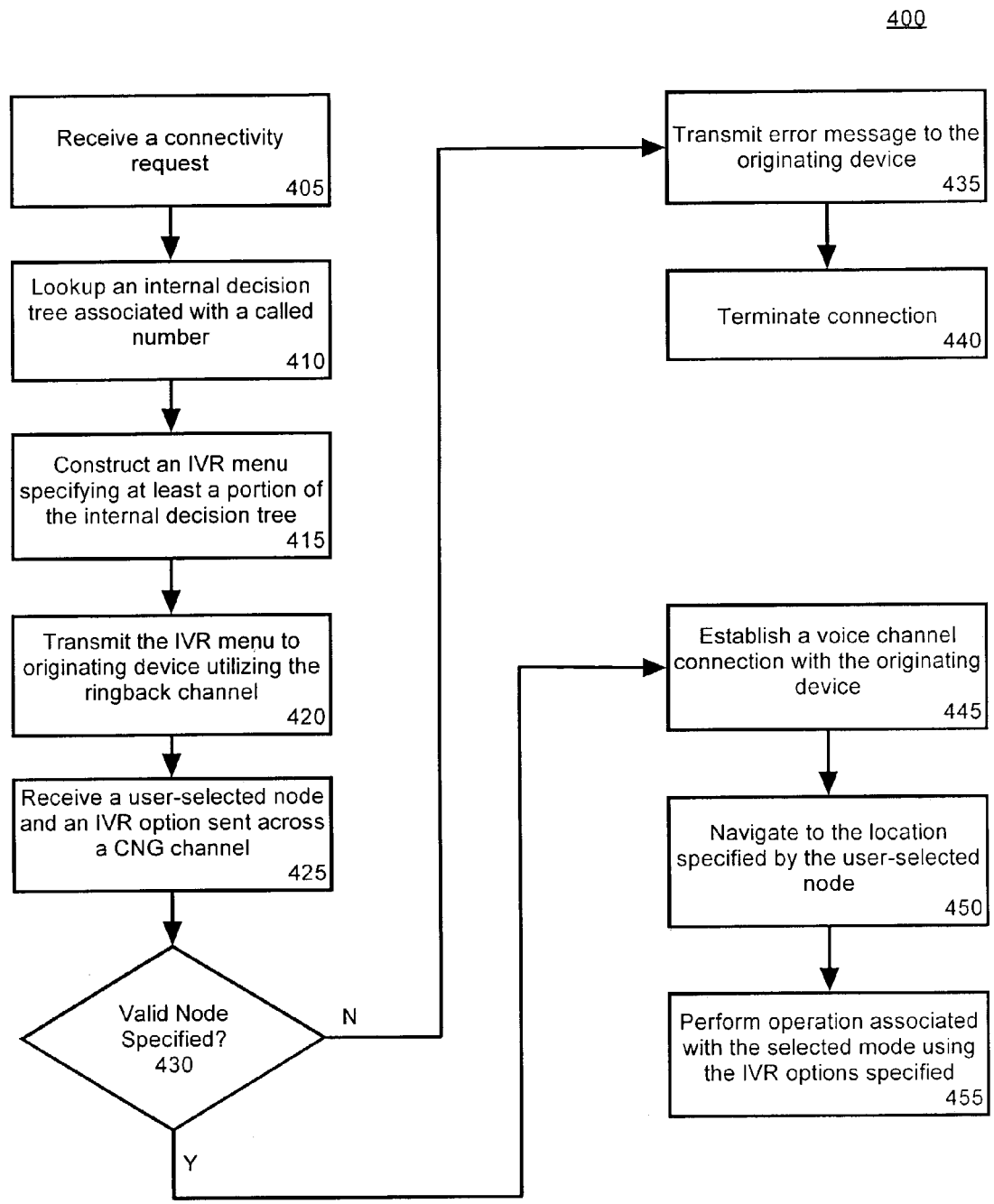
FIG. 4 is a flow chart illustrating a method for utilizing an IVR menu using the system of FIG. 1.

FIG. 4 is a flow chart illustrating a method 400 for implementing an IVR system using the system of FIG. 1. The method can be performed in the context of an originating device contacting the IVR system via a telecom network. The method 400 can begin in step 405 where an IVR system receives a connectivity request.

In step 410, the IVR system can access a data storage area to determine what applications are available that contain corresponding menu structures and are associated with a called phone number. The IVR system can contain a plurality of IVR applications associated with different telephone numbers. In step 415, an IVR menu can be constructed that specifies at least a portion of the internal decision tree utilized by the IVR system. Notably, some portions of a particular decision tree can be restricted to certain authorized users. Accordingly, only the portion of the internal decision tree that the originating device is authorized to access or capable of displaying will be specified within the IVR menu.

In step 420, the IVR system can transmit the IVR menu to the originating device through a ringback channel as described. In step 425, a user-selected mode and an IVR option can be conveyed through a CNG channel. Notably, the IVR option can specify particular options that are available to users of the IVR system. In step 430, the method can determine if the user-specified node and IVR options are available for the user.

If a valid node has not been specified, the method can proceed to step 435, where the IVR system can generate and transmit an error message to the originating device. In step 440, the IVR system can terminate any open communication connections established with the originating device.

If a valid node within the IVR menu has been specified, the method can proceed to step 445, where the IVR system can establish a voice channel connection with the originating device. In step 450, the IVR system can navigate to a location specified by the user-selected node. In step 455, an operation associated with the selected node can be performed using the specified IVR options.

Figure 5:
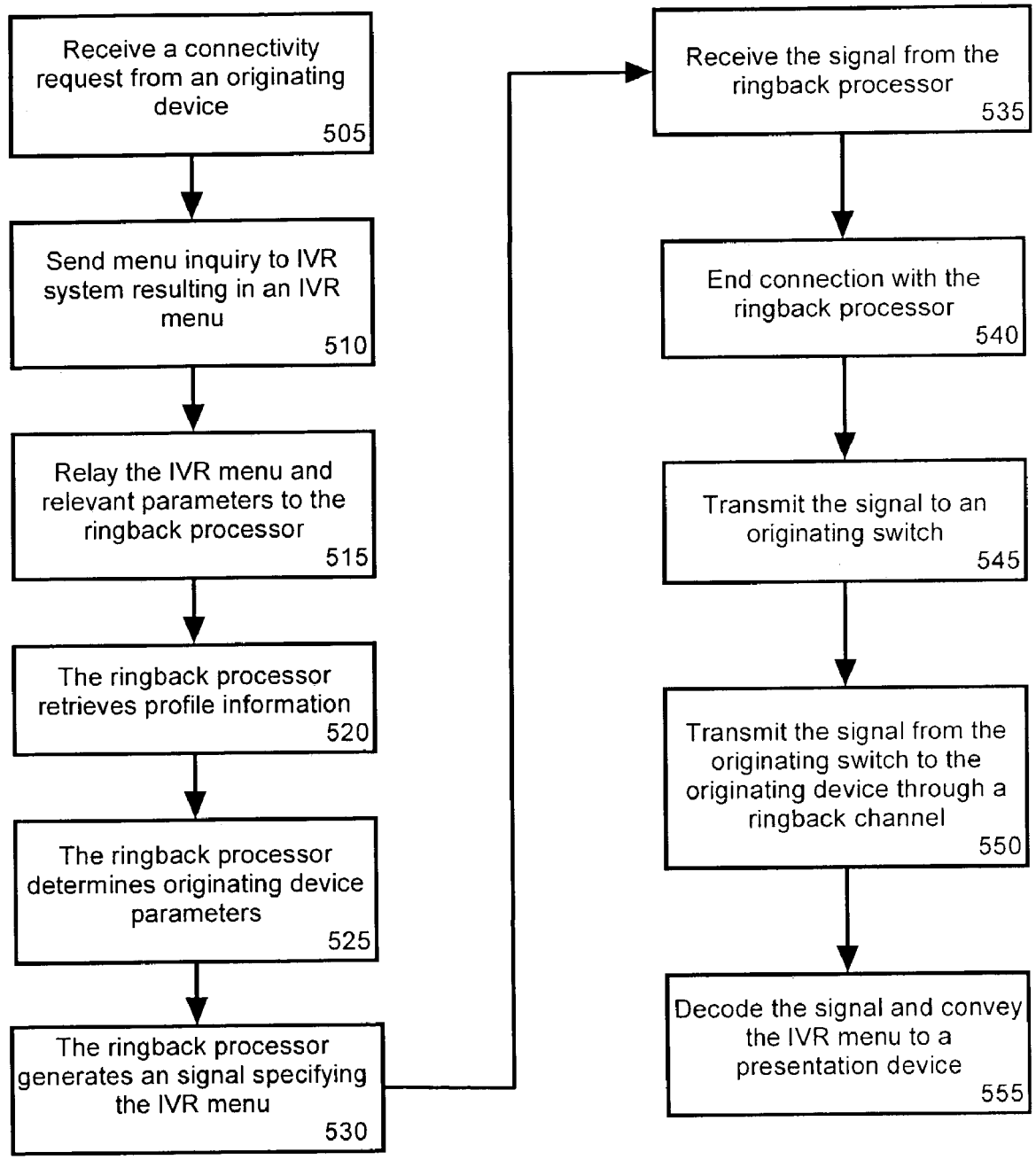
FIG. 5 is a flow chart illustrating a method for utilizing a ringback channel to transmit an IVR menu to an originating device using the system of FIG. 1.

FIG. 5 is a flow chart illustrating a method 500 for utilizing a ringback channel to transmit an IVR menu using the system of FIG. 1. The method 500 can be performed in the context of an attempted telephony connection. The method 500 begins in a state before a voice channel connection is established between an originating device and an IVR system. The method assumes that a telephony environment exists where a communication pathway is available to a destination switch through which the destination switch can relay a ringback transmission to an originating device.

The method 500 can begin in step 505, where a destination switch receives a connectivity request from the originating device. While in many cases, the connectivity request will be for a dedicated circuit-switched voice connection, the method can operate equally as well within a packet-switched environment. In step 510, the method can send an IVR query to the IVR system. The IVR system can determine from the IVR query that a particular IVR system is associated with a specified called telephone number. Accordingly, an IVR menu can be generated.

In step 515, the IVR menu and relevant parameters can be relayed from the IVR system to the ringback processor. The ringback processor can generate a signal formatted for a presentation device associated with the originating device. Relevant parameters conveyed from the IVR system can include, but are not limited to, originating device identification parameters, IVR system parameters, and special processing parameters related to the IVR menu.

In step 520, the ringback processor can retrieve profile information concerning the originating device. For example, profile information can include, but is not limited to, such information as the calling telephone number, the nature of the IVR system, capabilities of the presentation device, presentation device options, and unique connection requirements. The profile information can be located in an external data store, can be contained within the ringback processor, or can be contained within parameters passed to the ringback processor.

In step 525, the ringback processor can determine originating device parameters. In one embodiment, the format of IVR menu can be modified according to the capabilities of an originating device. For example, if an originating device is configured to accept a rendition of the IVR menu in a Portable Document Format (pdf), then a pdf document can be included within a transmitted signal.

In step 530, the ringback processor can generate a signal conveying the IVR menu. This signal can be either an analog or a digital signal. In step 535, the ringback processor can send the signal to the destination switch. Thereafter, in step 540 the connection with the ringback processor can be terminated. In step 545, the ringback transmission can be relayed through the telephony network to the originating switch. Notably, if the originating device and IVR system are both connected to the same switch, step 545 is unnecessary. In step 550, the originating switch can transmit the signal to the originating device through a designated ringback channel. This ringback channel can be a frequency range within the voice band designated for ringback signals. In step 555, the originating device can decode the signal and convey the IVR menu to a presentation device.

It should be appreciated that while the embodiment described in FIG. 5 includes a ringback processor and extensively utilized its capabilities to transmit signals to the originating device, the invention does not require a separate ringback processor. Instead, the functionality attributed to the ringback processor in FIG. 5 can be incorporated within the IVR system.

Figure 6:
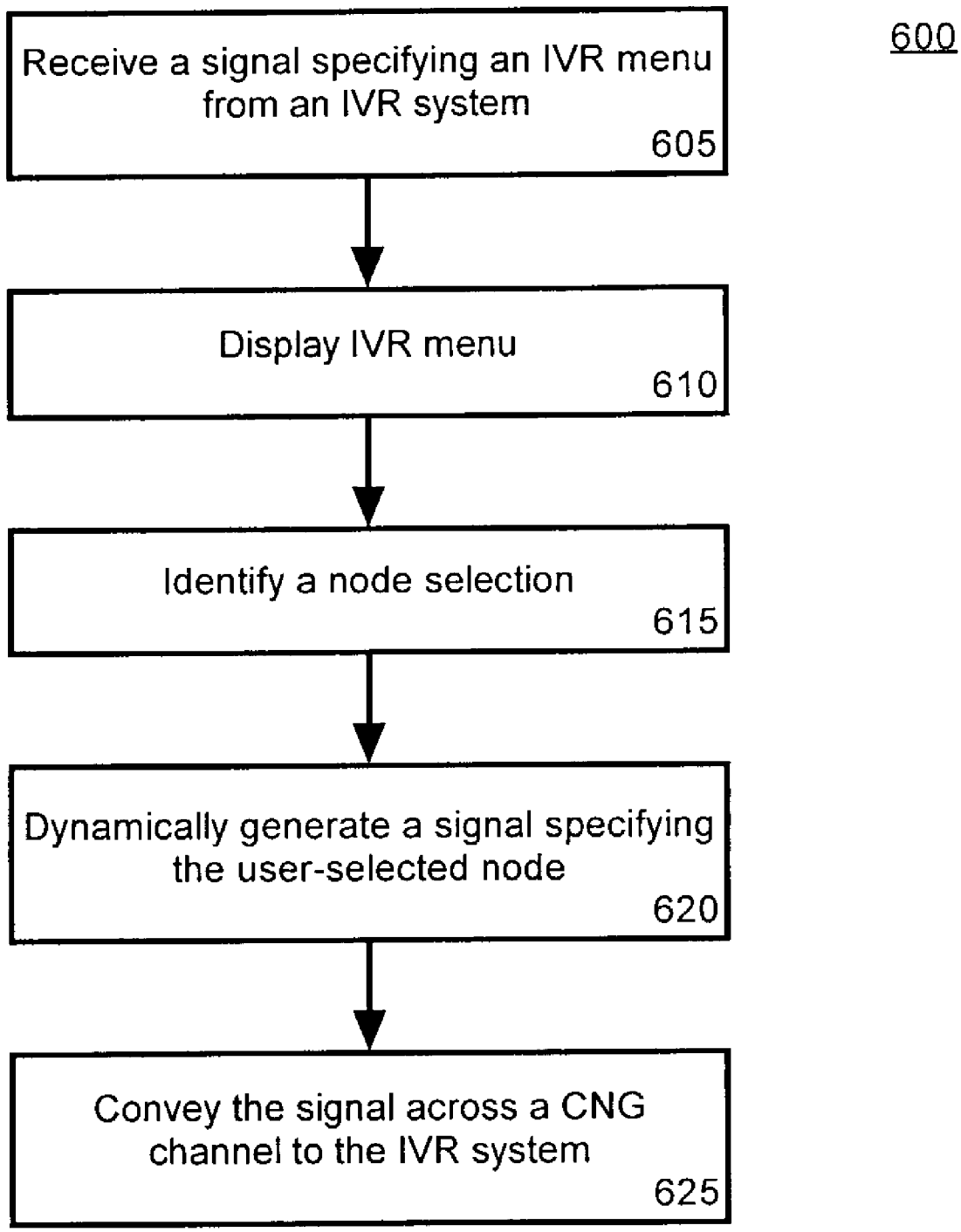
FIG. 6 is a flow chart illustrating a method for utilizing a CNG channel to send an IVR option an IVR system using the system of FIG. 1.

FIG. 6 is a flow chart illustrating a method 600 for utilizing a CNG channel to send IVR data to an IVR system using the system of FIG. 1. The method 600 can be performed in the context of pre-connection telephony signaling from an originating device to an IVR system. The method 600 can begin in step 605 where the originating device receives an IVR menu from the IVR system. This IVR menu can be transmitted across a ringback channel.

In step 610, the originating device can present an IVR menu within a GUI. This presentation can occur entirely within the originating device or can utilize an external presentation device. In step 615, a user of the originating device can select a particular node. In step 620, a signal can be responsively generated specifying the user-selected node. In step 625, the method can convey the signal across a CNG channel. Notably, the conveyance of the signal, as well as all previously mentioned steps, can occur before a voice channel connection is established between the originating device and the IVR system. Additionally, the CNG channel across which the signal is conveyed can be the previously detailed frequency range centered around 1,100 Hz.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for receiving and presenting interactive voice response data, the method comprising the steps of:
   sending a telephony connectivity request for establishing a voice channel connection between an originating device and an interactive voice response system;
   prior to establishing said voice channel connection, receiving an interactive voice response menu associated with said interactive voice response system via a ringback channel, said interactive voice response menu including a plurality of user-selectable navigation nodes for navigating said interactive voice response menu;
   downloading and storing said interactive voice response menu at said originating device;
   presenting prior to establishing said voice channel connection at least a portion of said interactive voice response menu to a user of said originating device; and
   conveying a user-selected navigation node selected by a user from the plurality of user-selectable navigation nodes to said interactive voice response system, said user-selected node being conveyed to said interactive voice response system prior to establishing said voice channel connection.

2. The method of claim 1, further comprising the steps of:
   conveying said interactive voice response menu from said originating device to a presenting device communicatively linked said originating device;
   presenting said interactive voice response menu with said presenting device and;
   interactively navigating said interactive voice response menu using said presenting device.

3. The method of claim 2, further comprising disconnecting said originating device from said ringback channel after downloading and storing said interactive voice response menu and before said voice channel connection is established.

4. The method of claim 2, wherein said presenting step occurs after downloading and storing said interactive voice response menu and after disconnecting said originating device from said ringback channel and before said voice channel connection is established by utilizing said presenting device communicatively linked to said originating device.

5. The method of claim 1, wherein said conveying step comprises transmitting said user-selected node to said interactive voice response system via a calling tone (CNG) channel.

6. The method of claim 5, further comprising the step of:
establishing said voice channel connection with said interactive voice response system, wherein said user-selected node is received via the CNG channel before said establishing step.

7. The method of claim 5, further comprising the step of:
establishing said voice channel connection with said interactive voice response system;
conveying at least one additional user-selected node after said establishing step; and,
navigating to a location within said interactive voice response system specified by said additional user-selected node.

8. A method for providing interactive voice response data to a telephony device comprising the steps of:
receiving a telephony connectivity request for establishing a voice channel connection between an originating device and an interactive voice response system, wherein said interactive voice response system contains an internal interactive voice response decision tree having a plurality of user-selectable navigation nodes for navigating said interactive voice response system;
prior to establishing said voice channel connection, transmitting an interactive voice response menu specifying at least a portion of said interactive voice response decision tree to said originating device via a ringback channel;
downloading and storing said interactive voice response menu to said originating device
prior to establishing said voice channel connection, presenting at least a portion of said interactive voice response menu to a user of said originating device; and
conveying a user-selected navigation node selected by a user from the plurality of user-selectable navigation nodes to said interactive voice response system, said user-selected node being conveyed to said interactive voice response system prior to establishing said voice channel connection.

9. The method of claim 8, further comprising the step of:
dynamically generating said at least a portion of said interactive voice response menu.

10. The method of claim 8, further comprising the steps of:
accessing specific information based upon said originating device; and,
modifying at least a portion of said interactive voice response menu based upon said specific information.

11. The method of claim 8, further comprising the step of:
prior to establishing said voice channel connection, terminating a connection with said originating device.

12. The method of claim 8, further comprising the steps of:
conveying said user-selected node specifying a node within said interactive voice response menu via a calling tone (CNG) channel; and,
responsively navigating to a location within said interactive voice response system specified by said user-selected node.

13. The method of claim 12, further comprising the step of:
establishing said voice channel connection between said originating device and said interactive voice response system, wherein said user-selected node is received via the CNG channel before said establishing step.

14. The method of claim 12, further comprising the steps of:
establishing said voice channel connection between said originating device and said interactive voice response system; and
conveying at least one additional user-selected node is received after said establishing step.

15. The method of claim 8, further comprising the steps of:
prior to establishing said voice channel connection, receiving an interactive voice response option via a calling tone (CNG) channel.

16. The method of claim 15, further comprising the steps of:
responsive to information contained within said interactive voice response option, generating an option response; and,
transmitting said option response to said originating device via a ringback channel prior to establishing said voice channel connection.

17. A computer readable storage medium having stored thereon a computer program having a plurality of code sections executable by a computer for causing the computer to perform the steps of:
sending a telephony connectivity request for establishing a voice channel connection between an originating device and an interactive voice response system;
prior to establishing said voice channel connection, receiving an interactive voice response menu associated with said interactive voice response system via a ringback channel, said interactive voice response menu including a plurality of user-selectable navigation nodes for navigating said interactive voice response menu;
downloading and storing said interactive voice response menu at said originating device;
presenting prior to establishing said voice channel connection at least a portion of said interactive voice response menu to a user of said originating device; and
conveying a user-selected navigation node selected by a user from the plurality of user-selectable navigation nodes to said interactive voice response system, said user-selected node being conveyed to said interactive voice response system prior to establishing said voice channel connection.

18. The computer readable storage medium of claim 17, further comprising the steps of:
conveying said interactive voice response menu from said originating device to a presenting device communicatively linked to said originating device;
presenting said interactive voice response menu with said presenting device and; interactively navigating said interactive voice response menu using said presenting device.

19. The computer readable storage medium of claim 18, further comprising disconnecting said originating device from said ringback channel after downloading and storing said interactive voice response menu and before said voice channel connection is established.

20. The computer readable storage medium of claim 18, wherein said presenting step occurs after downloading and storing said interactive voice response menu and after disconnecting said originating device from said ringback channel and before said voice channel connection is established by utilizing said presenting device communicatively linked to said originating device.

21. The computer readable storage medium of claim 17, wherein said conveying step comprises transmitting said user-selected node to said interactive voice response system via a calling tone (CNG) channel.

22. The computer readable storage medium of claim 21, further comprising the step of:
establishing said voice channel connection with said interactive voice response system, wherein said user-selected node is received via the CNG channel before said establishing step.

23. The computer readable storage medium of claim 21, further comprising the step of:
establishing said voice channel connection with said interactive voice response system;
conveying at least one additional user-selected node after said establishing step; and,
navigating to a location within said interactive voice response system specified by said additional user-selected node.

24. A computer readable storage medium, having stored thereon a computer program having a plurality of code sections executable by a computer for causing the computer to perform the steps of:
receiving a telephony connectivity request for establishing a voice channel connection between an originating device and an interactive voice response system, wherein said interactive voice response system contains an internal interactive voice response decision tree having a plurality of user-selectable navigation nodes for navigating said interactive voice response system;
prior to establishing said voice channel connection, transmitting an interactive voice response menu specifying at least a portion of said interactive voice response decision tree to said originating device via a ringback channel;
downloading and storing said interactive voice response menu to said originating device
prior to establishing said voice channel connection, presenting at least a portion of said interactive voice response menu to a user of said originating device; and
conveying a user-selected navigation node selected by a user from the plurality of user-selectable navigation nodes to said interactive voice response system, said user-selected node being conveyed to said interactive voice response system prior to establishing said voice channel connection.

25. The computer readable storage medium of claim 24, further comprising the step of:
dynamically generating said at least a portion of said interactive voice response menu.

26. The computer readable storage medium of claim 24, further comprising the steps of:
accessing specific information based upon said originating device; and,
modifying at least a portion of said interactive voice response menu based upon said specific information.

27. The computer readable storage medium of claim 24, further comprising the step of:
prior to establishing said voice channel connection, terminating a connection with said originating device.

28. The computer readable storage medium of claim 24, further comprising the steps of:
conveying said user-selected node specifying a node within said interactive voice response menu via a calling tone (CNG) channel; and,
responsively navigating to a location within said interactive voice response system specified by said user-selected node.

29. The computer readable storage medium of claim 28, further comprising the step of:
establishing said voice channel connection between said originating device and said interactive voice response system, wherein said user-selected node is received via the CNG channel before said establishing step.

30. The computer readable storage medium of claim 28, further comprising the steps of:
establishing said voice channel connection between said originating device and said interactive voice response system; and
conveying at least one additional user-selected node after said establishing step.

31. The computer readable storage medium of claim 24, further comprising the steps of:
prior to establishing said voice channel connection, receiving an interactive voice response option via a calling tone (CNG) channel.

32. The computer readable storage medium of claim 31, further comprising the steps of:
responsive to information contained within said interactive voice response option, generating an option response; and,
transmitting said option response to said originating device via a ringback channel prior to establishing said voice channel connection.

* * * * *